United States Patent Office 3,042,522
Patented July 3, 1962

3,042,522
PHOTOGRAPHIC FILM AND A COMPOSITION FOR IMPROVING THE SLIPPAGE CHARACTERISTICS THEREOF
Aaron J. Ben-Ezra, Binghamton, N.Y., assignor to General Aniline & Film Corporation, New York, N.Y., a corporation of Delaware
No Drawing. Filed June 13, 1958, Ser. No. 741,723
11 Claims. (Cl. 96—87)

This invention relates to a photographic film having good slippage properties and to a composition for imparting good slippage properties to the film. More particularly, this invention relates to photographic films such as motion picture film and 35 mm. films, for example, treated with a composition which enables these films to move freely within the camera without jamming therein.

It is an object of this invention to provide a composition, which when applied to photographic film, improves the slippage properties thereof, but does not impair its photographic properties.

It is another object of this invention to provide a photographic film which has good slippage properties and also good photographic properties.

Other objects and advantages of this invention will appear from the following detailed description thereof.

I have found that when a mixture of an acylated taurine derivative and a water-dispersible silicone emulsion are applied to a photographic film, the mixture imparts superior slippage properties to the film and does not impair the photographic properties thereof. Moreover, the mixture does not have other disadvantages which result when the components are used individually for this purpose. Thus, the water-dispersible silicone emulsion alone, while it imparts good slippage properties to the film, has poor coating qualities and imparts a severe repellency to the film which interferes with the coating and developing processer, whereas the acylated taurine derivatives, while possessing good coating properties, are not very effective slippage agents when used alone. However, when a silicone emulsion and an acylated taurine compound are mixed together, there is obtained a synergistic effect and the mixture has good coating properties and imparts excellent slippage properties to the film without impairing the photographic properties thereof.

The acylated taurine derivatives are known surface active agents and are known commercially as IGEPON®T, IGEPON®TK, IGEPON®CN, (sold by General Aniline & Film Corporation) ALKAGEL, etc. These acylated taurates have the following general chemical formula:

$$R_1CON(R).CH_2CH_2SO_3X$$

wherein R is an hydrogen atom or a methyl group, $R_1$ is the hydrocarbon residue of an acid of the aliphatic and alicyclic series having from 10 to 20 carbon atoms. Such acids include myristic acid, lauric acid, palmitic acid, oleic acid, stearic acid, or abietic acid.

Typical representatives of such taurates have the following structures:

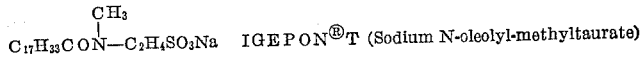  IGEPON®T (Sodium N-oleoyl-methyltaurate)

  IGEPON®TK (Sodium N-abietoyl-N-methylaurate)

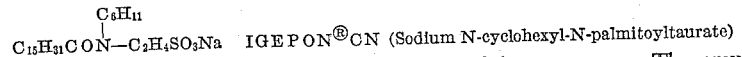  IGEPON®CN (Sodium N-cyclohexyl-N-palmitoyltaurate)

Alkagel is sodium N-oleyl-N-methyltaurate. Other surface active agents such as saponin, for example, have been tried in combination with silicone but this combination does not produce the superior slippage properties obtained by the use of the acylated taurine derivatives in combination with silicone.

The water-dispersible silicone emulsions are also known compositions. These emulsions are sold by the Dow Corning Corp. under the trade names DC-35 and DC-36. These emulsions are water-dispersible liquids containing about 35 percent silicone. They contain as their active ingredients dialkyl silicones such as dimethyl silicone, diethyl silicone; diaryl silicones such as diphenyl silicone. The preparation and properties of such silicones are well known and described for instance, in Reuben Gutoff's article entitled "Silicone Fluid Manufacture" published in Industrial and Engineering Chemistry, vol. 49, pages 1807–1811.

If the silicones are applied in a non-aqueous system, such as a backwash as for a motion picture film, it is not necessary to use an emulsion of the silicone and a suitable solvent or solvent system such as acetone-methanol, acetone-dichloroethane methanol-methyl acetate can be used instead.

The mixture of the water-dispersible silicone emulsion and acylated taurine derivative may be applied to the film in a number of different ways. The mixture may be added to the silver halide gelatin emulsion where the emulsion forms the uppermost layer of the film or to the gelatin of the gelatin surface layer if there is one. It may be added to the rinse water used as a rinse over the emulsion layer. The mixture may also be added to the subbing solution or to the wash applied to the film base on the side opposite the emulsion.

The amounts of acylated taurine compound and of silicone emulsion added may be varied. I have found, however, that the best results are obtained when these amounts vary from 0.01 percent to 1 percent, based on the volume of coating solution, of each of the acylated taurine compound and the silicone emulsion. When using Alkagel as the surface active agent, I prefer to use 0.1 percent to 0.5 percent of each component of the mixture based on the volume of the coating solution.

The following example illustrating my invention is given. It is to be understood, however, that this example is given by way of illustration and not by way of limitation.

Example

A quantity of conventional silver halide color emulsion containing gelatin as a carrier was divided into four samples and designated A, B, C and D. The following compounds or compositions were then added to these samples:

| Sample | Compound Added | Amount Added, percent |
|---|---|---|
| A | Saponin | 0.5 |
| B | Alkagel | 0.5 |
| C | Saponin | 0.5 |
|   | +DC-36 silicon emulsion | 0.2 |
| D | Alkagel | 0.5 |
|   | +DC-36 silicon emulsion | 0.2 |
| E | DC-36 silicon emulsion (Dow Corning's dimethyl polysiloxane). | 0.2 |

The emulsion samples this obtained were then coated on 16 mm. motion picture film base and 35 mm film base.

The films thus produced were found to be of good appearance and photographically as satisfactory as the films which were free of the added compounds. The only exception was sample E which could not be coated on account of repellency.

The films coated with samples A, B, C and D were then tested for slippage. This was done by dragging a 500 gram weight across the coated film face with a spring balance and a reading obtained on the balance. The results are tabulated below. The numbers appearing under "Drag Slippage" are the readings on the spring balance.

| Emulsion sample: | Drag slippage, g. |
| --- | --- |
| A ("Saponin" alone) | 220 |
| B ("Alkagel" alone) | 190 |
| C ("Saponin" + DC–36) | 140 |
| D ("Alkagel" + DC–36) | 120 |

The above samples were then tested in 16 mm. cameras and in 35 mm. magazines. Sample D (Alkagel + DC–36) was found to possess slippage properties far superior to the other samples or to films which did not contain my novel slippage mixture.

Modifications may be resorted to within the scope of the appended claims.

I claim:

1. A photographic film comprising a base carrying as its uppermost layer a light sensitive silver halide gelatin emulsion layer containing a uniform mixture of an acylated taurine compound having the general chemical formula $$R_1CONH.CH_2CH_2SO_3X$$
(with R on the N)

wherein R is selected from the group consisting of hydrogen and lower alkyl R₁ is the hydrocarbon residue of an acid selected from the group consisting of aliphatic and alicyclic acids having from 10 to 20 carbon atoms and X is an alkali metal and a dimethyl polysiloxane for imparting increased slippage to said film, the amount of said taurine and of said polysiloxane ranging from 0.1 to 0.5 percent based on the volume of the coating solution from which said silver halide emulsion layer is prepared.

2. A photographic film as recited in claim 1, wherein the acylated taurine compound is sodium oleyl methyltaurate.

3. A photographic film comprising a base and a gelatin silver halide emulsion layer, said base having on its side opposite the emulsion layer a coating which comprises gelatin having dispersed therein a mixture of an acylated taurine compound having the general chemical formula $$R_1CONH.CH_2CH_2SO_3X$$

wherein R is selected from the group consisting of hydrogen and lower alkyl, R₁ is the hydrocarbon residue of an acid selected from the group consisting of aliphatic and alicyclic acids having from 10 to 20 carbon atoms and X is an alkali metal and a dialkyl silicone for imparting improved slippage characteristics to the film.

4. A photographic film comprising a base and a light-sensitive silver halide emulsion coating thereon, said emulsion having uniformly dispersed therein a mixture of an acylated taurine compound having the general chemical formula $$R_1CONH.CH_2CH_2SO_3X$$

wherein R is selected from the group consisting of hydrogen and lower alkyl, R₁ is the hydrocarbon residue of an acid selected from the group consisting of aliphatic and alicyclic acids having from 10 to 20 carbon atoms and X is an alkali metal and a dialkyl silicone for imparting increased slippage to said film.

5. A photographic film comprising a base and a light-sensitive gelatin silver halide emulsion layer, said film having applied to said emulsion layer a coating which comprises a mixture of an acylated taurine compound having the general chemical formula $$R_1CONH.CH_2CH_2SO_3X$$

wherein R is selected from the group consisting of hydrogen and lower alkyl, R₁ is the hydrocarbon residue of an acid selected from the group consisting of aliphatic and alicyclic acids having from 10 to 20 carbon atoms and X is an alkali metal and a dialkyl silicone for imparting improved slippage characteristics to the film.

6. A photographic film comprising a base and a gelatin silver halide emulsion layer, said base having on its side opposite the emulsion layer a coating which comprises gelatin and a mixture of from 1 to 5 parts of acylated taurine compound having the general chemical formula $$R_1CONH.CH_2CH_2SO_3X$$

wherein R is selected from the group consisting of hydrogen and lower alkyl, R₁ is the hydrocarbon residue of an acid selected from the group consisting of aliphatic and alicyclic acids having from 10 to 20 carbon atoms and X is an alkali metal and from 1 to 5 parts of a dialkyl silicone for imparting improved slippage characteristics to the film.

7. A photographic film comprising a base and a light-sensitive silver halide emulsion coating thereon, said emulsion having uniformly dispersed therein a mixture of from 1 to 5 parts of an acylated taurine compound having the general chemical formula $$R_1CONH.CH_2CH_2SO_3X$$

wherein R is selected from the group consisting of hydrogen and lower alkyl, R₁ is the hydrocarbon residue of an acid selected from the group consisting of aliphatic and alicyclic acids having from 10 to 20 carbon atoms and X is an alkali metal and from 1 to 5 parts of dialkyl silicone for imparting increased slippage to said film.

8. A photographic film comprising a base and a light-sensitive gelatin silver halide emulsion layer, said film having applied to said emulsion layer a coating which comprises a mixture of from 1 to 5 parts of an acylated taurine compound having the general chemical formula $$R_1CONH.CH_2CH_2SO_3X$$

wherein R is selected from the group consisting of hydrogen and lower alkyl, R₁ is the hydrocarbon residue of an acid selected from the group consisting of aliphatic and alicyclic acids having from 10 to 20 carbon atoms and X is an alkali metal and from 1 to 5 parts of a dialkyl silicone for imparting improved slippage characteristics to the film.

9. A photographic film base as recited in claim 3 wherein said dialkyl silicone is dimethyl polysilicone.

10. A photographic film as recited in claim 3, wherein the acylated taurine compound is sodium oleyl methyltaurate.

11. A photographic film as recited in claim 4, wherein the acylated taurine compound is sodium oleyl methyltaurate.

References Cited in the file of this patent
UNITED STATES PATENTS
2,139,778    Slack et al. _____ Dec. 13, 1938

(Other references on following page)

UNITED STATES PATENTS

| | | |
|---|---|---|
| 2,597,614 | Brown et al. | May 20, 1952 |
| 2,675,315 | Staehle et al. | Apr. 13, 1954 |
| 2,694,637 | Gray | Nov. 16, 1954 |
| 2,702,276 | Green | Feb. 15, 1955 |
| 2,739,891 | Knox et al. | Mar. 27, 1956 |

FOREIGN PATENTS

| | | |
|---|---|---|
| 785,174 | Great Britain | Oct. 23, 1957 |

OTHER REFERENCES

Currie: Industrial and Engineering Chemistry, vol. 46, No. 11, November 6, 1954, pages 2331–2333.